USO10165194B1

United States Patent
Baldwin

(10) Patent No.: US 10,165,194 B1
(45) Date of Patent: Dec. 25, 2018

(54) MULTI-SENSOR CAMERA SYSTEM

(71) Applicant: Amazon Technologies, Inc., Reno, NV (US)

(72) Inventor: Leo Benedict Baldwin, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 66 days.

(21) Appl. No.: 15/381,944

(22) Filed: Dec. 16, 2016

(51) Int. Cl.
*H04N 5/235* (2006.01)
*G06T 7/32* (2017.01)
*H04N 9/083* (2006.01)
*H04N 5/225* (2006.01)

(52) U.S. Cl.
CPC ............ *H04N 5/2355* (2013.01); *G06T 7/32* (2017.01); *H04N 5/2252* (2013.01); *H04N 5/2258* (2013.01); *H04N 9/083* (2013.01); *G06T 2207/10024* (2013.01); *G06T 2207/20208* (2013.01)

(58) Field of Classification Search
CPC .... H04N 9/045; H04N 5/2355; H04N 5/2252; H04N 5/2258; H04N 9/083; G06T 7/32
See application file for complete search history.

(56) References Cited

U.S. PATENT DOCUMENTS

| 5,852,502 A | * | 12/1998 | Beckett | G11B 27/031 358/512 |
| 2004/0212688 A1 | * | 10/2004 | Takano | H04N 9/045 348/218.1 |
| 2008/0024390 A1 | * | 1/2008 | Baker | G06T 3/4053 345/1.3 |
| 2008/0030611 A1 | * | 2/2008 | Jenkins | H04N 9/045 348/336 |
| 2010/0201831 A1 | * | 8/2010 | Weinstein | H04N 9/045 348/221.1 |
| 2013/0335599 A1 | * | 12/2013 | Zhang | H04N 13/25 348/239 |
| 2016/0119575 A1 | * | 4/2016 | Dabral | H04N 5/2355 348/362 |
| 2017/0099435 A1 | * | 4/2017 | Chen | H04N 5/232 |

* cited by examiner

Primary Examiner — Nicholas G Giles
(74) Attorney, Agent, or Firm — Hogan Lovells US LLP

(57) ABSTRACT

High dynamic range images are generated using conventional dynamic range cameras. A first camera is configured with exposure settings that are optimized for brighter regions, while a second camera assembly is optimized for darker regions. The cameras can be rectified and can capture concurrently such that objects are relatively aligned, with global and local misregistrations being minimized. The image data is analyzed to determine regions where the image data from one camera or the other provides higher quality, such as where the brightness values fall between a noise floor and a saturation level. If image data from both sets have values within that range then the values can be combined, such as with a weighted average. A composite image is generated that includes more uniform color and brightness than in either image individually, or that could have been captured using a single camera of similar cost and capabilities.

20 Claims, 9 Drawing Sheets ent electronic device. In
MULTI-SENSOR CAMERA SYSTEM

BACKGROUND

Computing systems continue to perform an increasing number of tasks of various levels of complexity. As technologies such as computer vision become more prevalent, there is a need for both higher accuracy and availability for these technologies. Unfortunately, high accuracy often comes with high cost, which limits the availability and practicality of these technologies for various applications. For example, the cost of high dynamic range cameras or cameras with high sensitivity can prevent their use in relatively inexpensive devices, which can limit the quality of image data that can be captured by these devices.

BRIEF DESCRIPTION OF THE DRAWINGS

Various embodiments in accordance with the present disclosure will be described with reference to the drawings, in which.

DETAILED DESCRIPTION

Figure 1A:
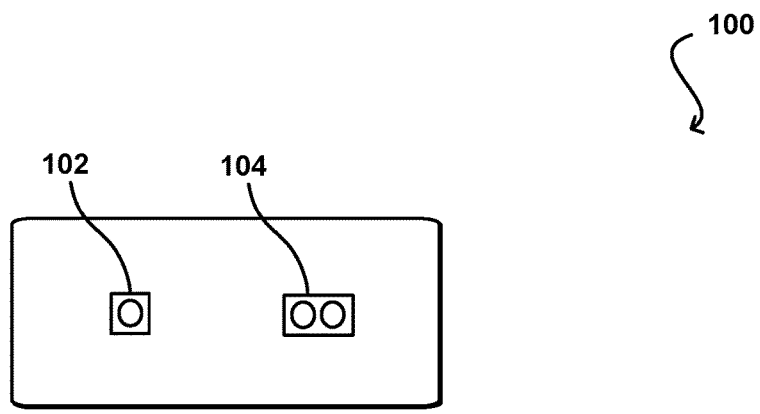
FIGS. 1A and 1B illustrate an example configuration of a camera array that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to capturing, generating, and/or manipulating image data using an electronic device. In particular, various embodiments enable the generation of high dynamic range images using relatively low cost cameras, such as may be used in smart phones and other such devices. A first camera can be configured with exposure settings that are optimized for brighter or "highlight" regions of a scene, while a second camera (or camera assembly) can be optimized with exposure settings that are optimized for darker or "shadow" regions of the scene. As discussed in more detail elsewhere herein, the cameras can be rectified, and can capture image data concurrently such that objects in the scene will be relatively aligned, with global and local misregistrations being able to be minimized programmatically. The image data can be analyzed to determine regions where the data from one camera or the other provides better image quality, such as where the pixel values (i.e., brightness and/or color values for the pixels) fall between a noise floor and a saturation level, potentially closest to a target range or value. If image data from both sets for a region have brightness values within that range then the values can be combined, such as with a weighted average. The data for the various regions can then be combined into a single composite image that exhibits more uniform color and brightness values than either image individually, or that could have been captured using a single camera of similar cost and capabilities. There can be discontinuities in the image due to the combination, but such discontinuities can be acceptable for applications such as computer vision. In some embodiments a mask can be generated that corresponds to the boundaries between regions of different image data, such that edges and features corresponding to the discontinuities can be ignored or otherwise indicated.

Various other applications, processes and uses are presented below with respect to the various embodiments.

Conventional miniature digital cameras, such as those used in mobile devices such as smart phones and tablet computers, have a limited sensitivity and dynamic range. The sensitivity will be defined at least in part by the noise floor, with a limited dynamic range between the noise floor and the saturation level. The saturation level in turn is set primarily by the full well capacity. Large pixel cameras, such as those used in prosumer cameras and cameras for scientific and medical use, can provide higher sensitivity through use of a larger pixel area and higher dynamic range due in part to a larger full-well capacity. Such sensors are relatively expensive, however, and demand correspondingly large and expensive lenses to take advantage of their imaging capability. For many applications this expenditure can be prohibitive. The need to utilize lower cost cameras, however, can result in lower quality images. For applications such as computer vision, these lower quality images can negatively impact the accuracy of various object identifications and other such results that are based on the image data.

FIG. 1A illustrates an example image capture device 100 that can be utilized in accordance with various embodiments. This device 100 includes an array of cameras that can be utilized to capture images with performance aspects similar to that of a large, expensive camera but using lower cost components. This particular device utilizes three cameras, including a single camera 102 and a camera pair 104 or camera assembly. As mentioned, additional or alternative camera components can be utilized as well within the scope of the various embodiments. Further, the three image sensors can be combined in a single element or assembly in other embodiments. The single camera 102 can be a conventional miniature digital camera, such as might be used in a smart phone or similar application. For current devices, this might include a 13MP CMOS sensor, although CCD sensors or other such elements can be utilized as well in various embodiments. In this example the single camera 102 can utilize an RGB (reg-green-blue color model) color filter array (CFA) to capture image data for the brightest regions of a scene, referred to herein as the highlight areas, where the scene includes objects within a field of view of the single camera 102. Using such a filter array, however, can prevent the single camera 102 from collecting adequate image data for darker regions of the scene, such as regions in dark shadows.

In order to capture adequate image data for the darker regions, the device includes a camera assembly 104, or pair of cameras provided as part of a single element. Different portions of a single image sensor or other arrangements or selections of camera elements can be utilized as well within the scope of the various embodiments. In this example the camera assembly 104 includes a conventional camera that can be similar to the single camera 102, although as discussed elsewhere herein a slightly lower resolution camera might be used in at least some embodiments. This camera can avoid use of an RGB or similar filter array in order to capture panchromatic image data. Panchromatic image data is similar to monochromatic data, but is obtained by a image sensor that is sensitive to all wavelengths of visible light. Since the panchromatic camera will not experience a significant loss of light through a CFA as will the single camera 102, its sensitivity will be approximately twice that of the single camera 102 since a conventional CFA will absorb about half of the optical energy. A companion camera of the camera assembly can be used to provide color data to be applied to the monochromatic, or grayscale, image obtained by the panchromatic camera of the assembly 104. The combination of the panchromatic camera and the companion color camera form an increased-sensitivity camera assembly that can be used to capture image data for darker regions of a scene, such as may correspond to one or more shadow areas. Using the image data from the single camera 102 for the highlight areas and the image data from the camera assembly 104 for the shadow areas can allow an image to be generated that provides significantly improved sensitivity and dynamic range versus image data captured with a single conventional camera (with similar capability) alone.

Such an image capture device 100 can be used to capture still images or video data, among other types of video data (i.e., VR or 3D image data). The characteristics of the cameras can be adjusted based at least in part upon the desired application. For example, such a device can be used to capture a 4K (8MP) video stream. The single camera 102, which can also be referred to as a highlight camera, can be selected with a resolution of around 12MP-13MP, since debayering (or reconstructing a full color image from incomplete color regions output from a sensor used with a CFA) has a resolution cost of about 0.7. After debayering and scaling the image sensor can yield a quality 8MP image. The panchromatic camera will not suffer the resolution loss from debayering, since it does not utilize a CFA, so the panchromatic camera for this application can be selected with an 8MP image sensor, or at the same resolution as the output video stream. This also provides an additional 1.6× improvement in sensitivity due to using larger pixels in the same format. As an example, this can involve increasing from 1.1 um pixels and 13MP in a ⅓" format to 1.4 um pixels and 8MP in the same ⅓" format. The color companion camera to the panchromatic camera of the assembly can be even lower resolution in some embodiments, as the color can be encoded at half the resolution of the luminance signal. In other embodiments the color companion camera might match the resolution of the single camera 102 in order to further expand the dynamic range of the camera system. Since this camera is used to provide chroma information in this example, its resolution can be one the order of about 4MP using 2.0 um pixels for an increase in sensitivity of about 3.3×. In such an example the panchromatic-color camera shadow camera pair each has a sensitivity of about 3.2× and 3.3× versus a standard color camera of similar capabilities. This allows the two exposures to be different by at least 3.3×, for an increase in sensitivity of at least 10 dB. This can enable scenes with less than one third as much light to be captured with the same fidelity as the conventional camera. Combining the shadow camera pair with the standard camera can nearly double the dynamic range over a conventional camera alone, enabling a much larger range of dark to bright color data to be captured with high fidelity.

Such an approach can provide significant cost savings over an expensive, high quality camera, but will still come with some additional cost over a single, conventional camera of similar quality. For example, there will additional cost for the two extra cameras and associated electronics, even though the additional cameras can be relatively inexpensive. There will be some additional resource expense, however, for storing, transmitting, and analyzing the three sets of image data. This can include, for example, computational overhead for combining the image data into a single set of image data before, for example, video encoding. In some embodiments the combining can involve matching areas locally between cameras and applying one or more transforms to the image data from at least two of the image sensors in order to attempt to match the perspectives between the image data. In some embodiments the data from each of the image sensors can be transformed to match the perspective of a fictitious ideal camera located between the physical cameras of the device.

Figure 1B:
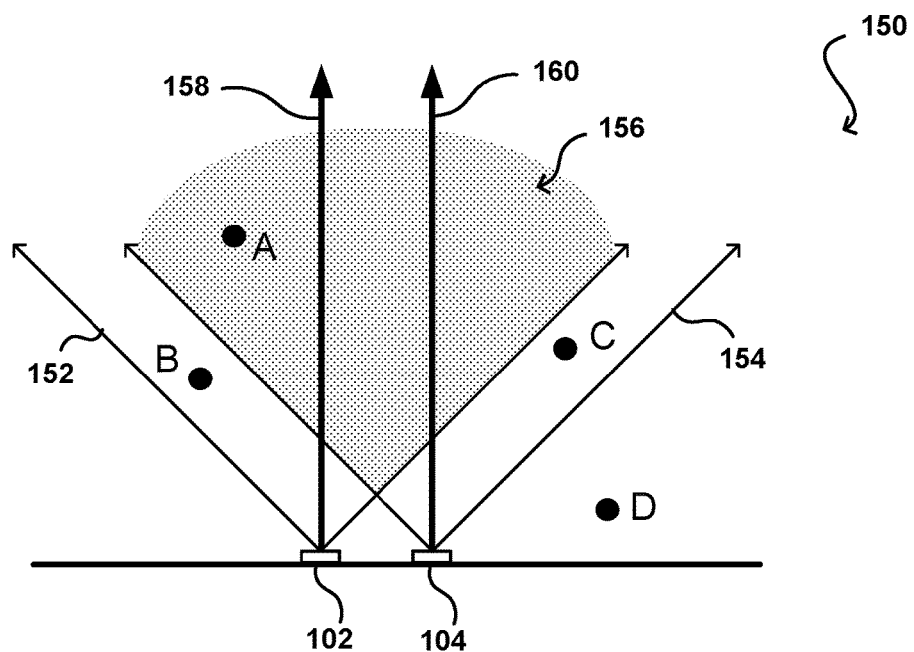

Using multiple cameras, however, can lead to potential issues due to the offset of the cameras. For example, the image sensor arrangement 150 in FIG. 1B illustrates that, due to the lateral offset between the cameras 102, 104 (or camera assemblies) there will be slightly different fields of view 152, 154 for each camera. Thus, an object imaged by both cameras will appear at a slightly different location in the image data captured by each camera, although as objects get further away the amount of disparity (or lateral offset in pixel positions) between the images will decrease such that for far away objects the objects can appear at approximately the same pixel location in image data captured by each camera 102, 104. Further, due to the differences in the fields of view, objects or features may appear in image data captured by one camera or other, but not both. For example, a point (A) in the overlapping field of view 156 will appear in image data captured by both cameras, although at potentially different pixel locations due to the disparity. Objects at other points may appear in image data only captured by one camera, such as where one point (B) is only in the field of view 152 of one of the cameras 102 and another point (C) is only in the field of view 154 of the other camera 104. An object (D) that falls outside both field of views 152, 154 will not be included in the image data captured by either camera. In order to minimize these differences, in some embodiments the cameras 102, 104 are placed as close together (laterally) as is practical. Because objects at different distances will have different amounts of disparity and thus appear at different locations between the various images, there can be various misregistrations present when combining the image data into a single set or stream of image data.

In addition to the cameras 102, 104 being laterally offset, there will be other differences or misregistration issues as well. These will be referred to herein as "global" misregistration issues, as they will be present in any image data captured by this pair of cameras due to the physical properties and arrangements of the cameras. For example, the cameras will generally not have their primary axes 158, 160 exactly parallel due to slight differences in the mounting or placements of the cameras, such as may be due to the top active surface of the image sensors not being in exactly the same plane. Thus, some calibration may be needed at manufacture, assembly, or other such times to attempt to account for any misregisration and enable the image data captured to adjust or account for the differences, making the effective optical axes 158, 160 substantially parallel. Without the axes being parallel any disparity information will be inaccurate and can cause objects to appear to be at difference distances and can potentially cause object positions in the image data to not converge at large distances. In addition to accounting for the lateral separation and misalignment, various other misregistrations can be determined during calibration and then accounted for in the processing of the image data. For example, there may be some relative rotation between the image sensors that will cause a corresponding change in the positions of objects captured in the image data, which can be adjusted through processing once determined. Further, the lenses for each camera can produce different distortions, and can have slightly different focal lengths that can result in different magnification levels, that can be accounted for during image processing. Various other effects can be determined during calibration as well, and the values or effects determined over time in order to account for any changes in position or function of the cameras.

As part of the calibration process the two cameras can be rectified. Rectification can involve determining a set of transformations to be applied to the captured image data to transform the actual captured image data into its theoretical best counterpart. The transformations can account for effects such as for pointing error, distortions in the image, axial rotations about the optical axis, or any other issues that may come into play when using mass produced components with various tolerances or allowable variations. As mentioned, the transformations can also account that the cameras have some lateral spacing between them and have slightly different views. The applied transformations can make captured images congruent on distant objects, although objects that were closer to the cameras will still exhibit some error due to the disparity. In some embodiments a plane or distance can be specified to which to make the cameras congruent. For example, if there is a region of interest that spans from a meter to three meters, the transformations can make the cameras congruent on a two meter distance to split the difference, with the differences increasing as the distance approaches one or three meters from the cameras. This may help to reduce the average error for objects captured in the region of interest. In some embodiments rectification can be performed by attempting to make both cameras ideal, while in other embodiments one camera is designated as a master and the second camera a slave. While the master will not be ideal, the second camera can be calibrated to match the master camera instead of trying to make both cameras function as ideal cameras. If the two cameras exhibit similar issues then this may be a simpler way to make the image data captured by the two cameras align and correspond than attempting to remove those issues for both cameras. Such an approach can also be beneficial for devices with more than two cameras. In such cases, the cameras can be analyzed to determine a closest-to-ideal camera, which can be selected as the master, and the other cameras can be matched to the master through rectification. Transforming one camera to match another camera can save half the processing required to rectify each of two cameras, etc.

Such an assembly can be used to perform imaging with a relatively high dynamic range. The dynamic ranges of the two cameras 102, 104 can be set to different range values, but can have a slight overlap, in order to obtain the greatest dynamic range possible. For many applications the lighting of objects represented in the captured image data will be largely uncontrolled or variable, such that it will be difficult to optimize the dynamic range for particular lighting conditions. Due at least in part to the differences in dynamic range settings, the image data captured by the two cameras will not be substantially redundant (excluding disparity and other such effects discussed and suggested elsewhere herein) but will be at least somewhat complementary. The image data captured by one camera may be significantly better (i.e., better contrast etc.) for the shadow regions but be saturated or washed out in the highlight regions, while the image data captured by the other camera may be significantly better for the highlight regions but almost completely black for the shadow regions, with some areas in an overlap or transition zone where the quality of image data captured by both cameras is of reasonable or acceptable quality. It should be understood that the "quality" of the data can be defined differently by different users and for different applications, as some applications may target higher precision in color differences for specific color ranges while others may target more uniformity in lighting and color variation across an image, among other such differences.

Figure 2:
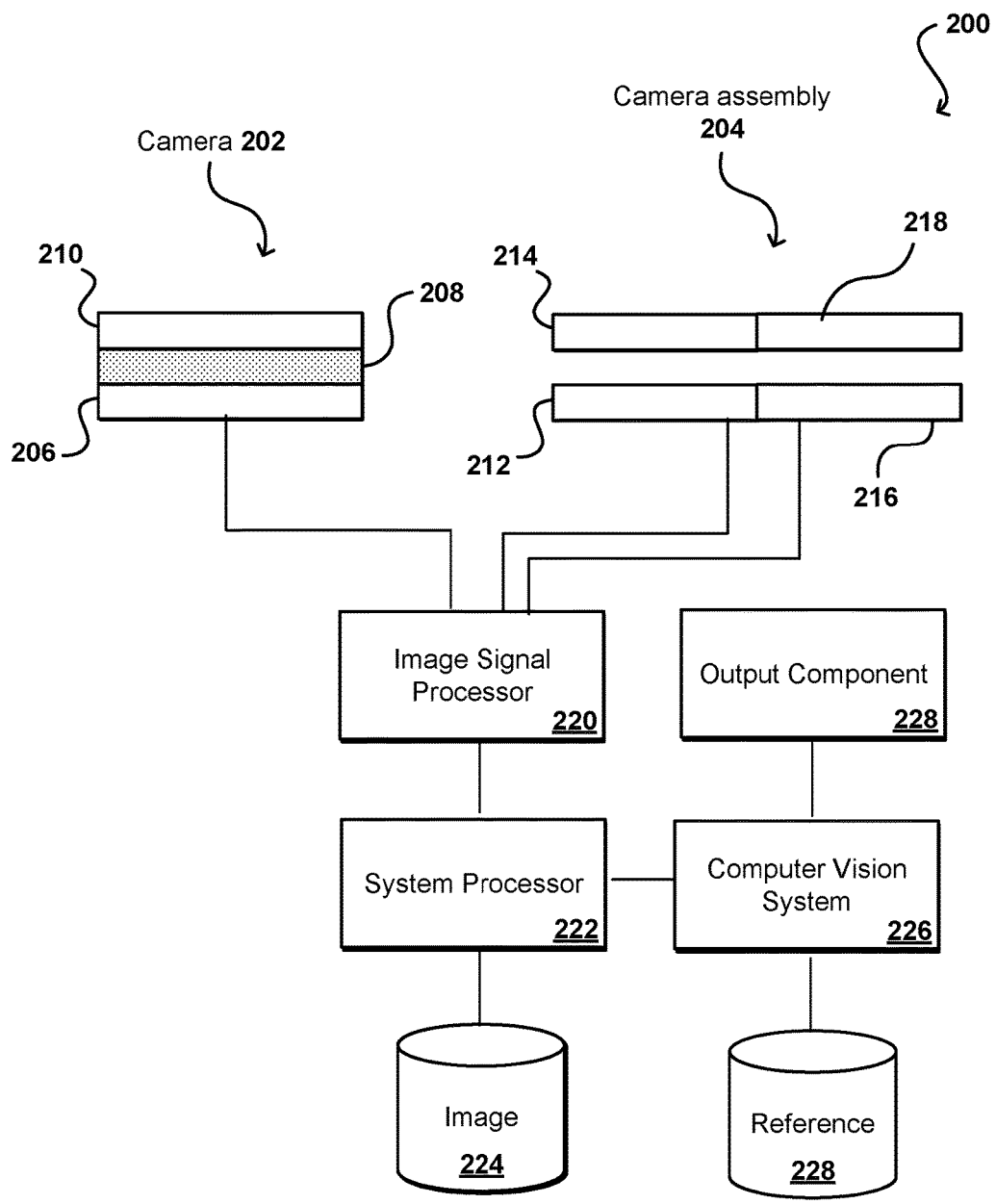
FIG. 2 illustrates components of an example image capture and analysis system that can be utilized in accordance with various embodiments.

FIG. 2 illustrates an example system 200 that can utilize aspects of the various embodiments. This example includes a single camera 202 and a camera assembly 204 such as is described with respect to FIG. 1A, but as mentioned various other numbers, types, or selections of cameras and imaging devices can be used as well within the scope of the various embodiments. The single camera 202 can be a conventional camera that includes a image sensor 206 and a lens 210, and in this example includes an RGB color filter array (CFA) 208 to capture image data for regions including the highlight regions of a scene. The system also includes a camera assembly 204, or pair of cameras that can be provided as part of a single element. In this example the camera assembly 204 includes a conventional image sensor 212 and lens 214 that can be similar to those of the single camera 202, although as discussed elsewhere herein a slightly lower resolution sensor might be used in at least some embodiments. This camera can avoid use of an RGB or similar filter array in order to capture panchromatic image data. A companion image sensor 216 and lens 218 of the camera assembly can be used to provide color data to be applied to the monochromatic, or grayscale, image obtained by the panchromatic image sensor 204. The combination of the panchromatic and color image data provides data with increased-sensitivity that can be used to capture quality image data for the shadow regions of a scene. Each camera can include a lens housing (not shown) holding the respective lens, and as mentioned in some embodiments the panchromatic and companion image sensors can utilize the same lens, and in some embodiments can correspond to different regions of a common sensor. As mentioned, the camera 202 and camera assembly 204 can be mounted with minimal separation and with the optical axes substantially parallel so as to have substantially overlapping fields of view.

The image data captured by the three image sensors 206, 212, 216 can be transferred to an image signal processor 220

(ISP) to perform various processing or modifications of the image data. The ISP 220 can perform various types of image processing, as may include debayering (to account for the pattern designated by the Bayer filter), bad pixel correction, relative illumination correction, demosaicing, image sharpening, and the like. The processed image data can then be passed to a system processor 222, or other main processor, for evaluation. The processor 222 can perform various tasks, such as to apply any global and/or local transformations to the image data as discussed elsewhere herein. In at least some embodiments the panchromatic and companion image data will be combined into a single set of image data, unless already combined through the camera assembly 204 or another such component. The image data from the single camera 202 will be referred to as highlight image data and the image data form the camera assembly 204 referred to as shadow image data for simplicity of explanation, but it should be understood that the image data includes data for other regions of the scene as well, but with varying quality as discussed elsewhere herein. Further as discussed, the image data can represent a pair of still images or a pair of video feeds or frames, among other such options. The highlight and shadow image data can each be evaluated for exposure in terms of their image intensity values for different regions of the image. The processor 222 can then combine image data from the two sets of image data, with the values of the brightness from each camera being combined based on a determined weighting for each determined region, pixel, or portion of the image data. The weighting applied can be determined by factors such as the difference between the range exposure values and the target range exposure values for each set of image data. Since many applications will opt for maximal dynamic range, the weightings for many of these regions will be either 0 or 1 for each camera, where for these regions the combined image data will include data from only the highlight image data or the shadow image data. For regions where the dynamic ranges overlap, or both fall within an acceptable range, the values from each set of image data can be combined for pixels falling in those overlap regions. In order to correlate the regions, in at least some embodiments the processor 222 or another such component can estimate the local disparity for objects represented in the image data and attempt to transform those regions into alignment. The determined values for each region can then be combined into a composite image that includes the determined values, effectively combining the best data from each camera into a single image or set of image data. As discussed in more detail elsewhere herein, the combined data can include shears or regions of misalignment, but for applications such as computer vision this misalignment may be acceptable in order to obtain the higher dynamic range image data. Once combined, the image data can be stored to an image repository 224 for subsequent analysis and/or can be passed directly to a computer vision system 226, service, or process that can analyze the composite image data and compare the image data to reference data or models from a reference repository 228 in order to attempt to identify one or more objects represented in the image data. Any data from the analysis for identified objects can then be provided via an output component 228, such as a display screen, network interface, data log, and the like.

Figure 3A:
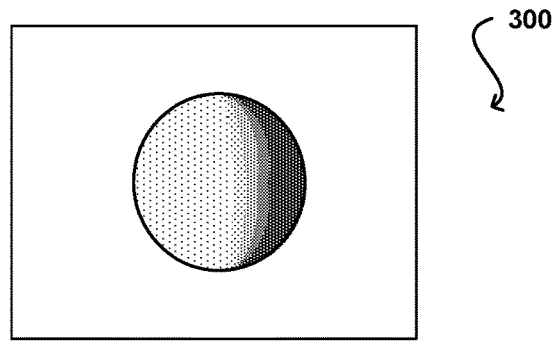
FIGS. 3A, 3B, 3C, and 3D illustrate image data that can be captured or produced in accordance with various embodiments.
Figure 3B:
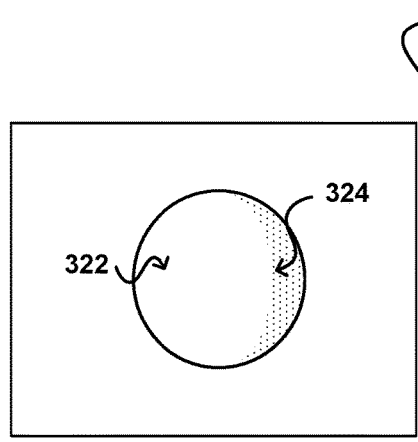

FIGS. 3A, 3B, 3C, and 3D illustrate example images that can be captured and/or generated in accordance with various embodiments. FIG. 3A illustrates an example image 300 that can be captured using a single conventional camera, such as may be contained in a smart phone or other such device, that has a conventional dynamic range for such devices. As illustrated, the primary object in the image has very inconsistent lighting, such that one side of the object is very bright while one side is very dark. While for objects such as a sphere this may not be crucial, for complex objects with many features the inability to view detail for part of the object can prevent accurate identification of the object from a computer vision process, or can otherwise prevent accurate color or feature determination from the representation of the object in the image data. Accordingly, approaches in accordance with various embodiments can use at least two cameras, or camera assemblies, to capture different versions of the image with different dynamic ranges, sensitivities, or other such imaging properties. While HDR processes are known that capture a series of images with different properties, these sequences are susceptible to motion artifacts between images and are not optimal for video capture. FIG. 3B illustrates a first image 320 of a set that can be captured by a first camera with first capture settings. This image can be intended to provide additional image data for the shadow regions 324, as additional light can be captured to provide greater detail for the shadow regions. Such settings, however, can cause the highlight regions 322, and other such regions, to become saturated or washed out, such that less detail is provided for those regions that might otherwise be provided by a single camera with conventional settings. As mentioned, there can be intermediate areas where a reasonable amount of detail and information is provided as well in such an image.

Figure 3C:
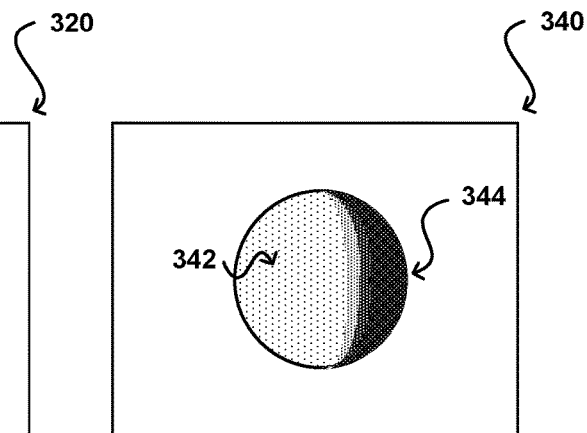
Figure 3D:
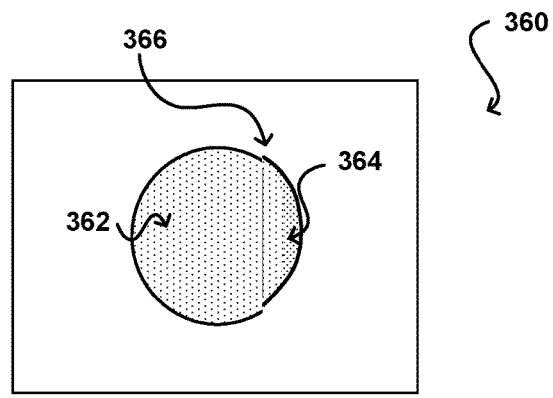

FIG. 3C illustrates a companion image 340 of the set that could be captured by a second camera, or camera assembly, with different capture settings. These settings can be selected in order to provide a higher level of detail for the highlight regions 342, even though the settings can cause the shadow regions 344 to be too dark or otherwise contain little detail. The pair of images 320, 340 can be processed to determine which regions from each image to select for a composite image. As mentioned, this can include selecting image data for the highlight regions from one image 340 and the shadow regions from the other image 320, and selecting a weighted combination of values for any other regions, although in some embodiments the data for each region of the composite image will come from one image or the other with no blending. Where the values are "blended" from the respective values of the two images, an appropriate blending technique can be used, as may include alpha blending of two or more color values for a determined pixel location. Other blending techniques can be used as well, such as may include Gaussian pyramid decomposition blending or Laplacian pyramid decomposition blending, among others. In some embodiments tone mapping is performed for the image data captured by the single camera with respect to the image data captured by the camera assembly, as there may be differences in brightness, contrast, color balance, saturation, or other such aspects that should be balanced between the two sets of image data before combination. The region data can then be combined to produce a composite image 360 that shows more even detail and colors across the entire image.

As illustrated, the brightness and color of the highlight region 362 can be similar to that for the shadow region 364 as well as any other regions for the object. As mentioned, however, there may be some slight difference in position of the object between the input images 320, 340, such that there can be some shears 366, displacements, or discontinuities in the composite image 360. While such artifacts may not be acceptable for consumer cameras for personal use in capturing photos, these artifacts may be acceptable for applications such as computer vision, particularly where the improved color and detail improves the overall accuracy of the analysis. As mentioned, computer vision and other such processes can also be trained or programmed to account for these artifacts when analyzing the composite image data.

Figure 4A:
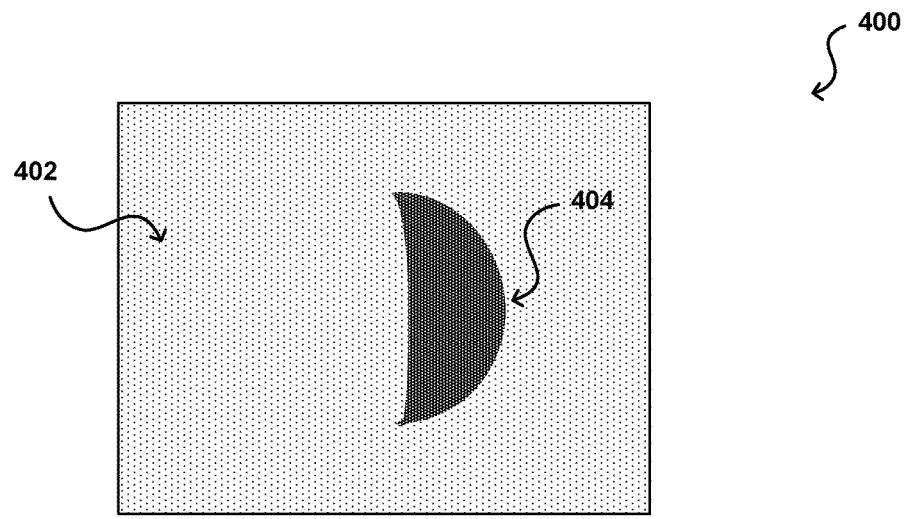
FIGS. 4A and 4B illustrate masks that can be produced for combined image data that can be utilized in accordance with various embodiments.
Figure 4B:
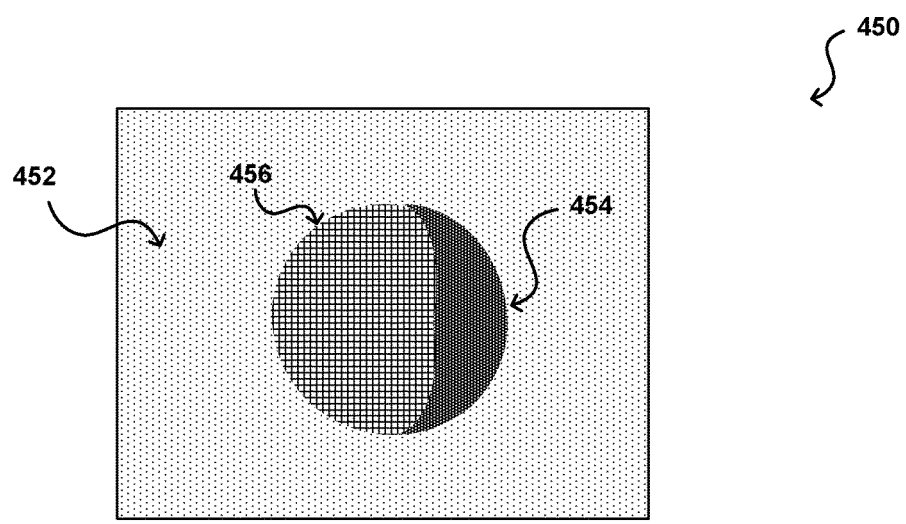

In some embodiments, the analysis of the composite image can be aided through the use of masks or mask data. As an example, FIG. 4A illustrates an example mask 400 that can be produced in accordance with various embodiments. Here, the pixel data for each region of the composite image comes from one of two input images. The mask indicates which region(s) 402 of the composite image correspond to one image, and which region(s) 404 correspond to the other image. In other embodiments the mask can be sent with both input images to enable the computer vision process to select the appropriate portions, as well as to potentially utilize the image data in ways other than as indicated by the mask. The mask enables a machine vision algorithm to understand which camera the information is coming from, as well as where discontinuities may exist near the boundaries on the mask that can be accounted for in the algorithm. For example, a shear can produce a spurious edge that could otherwise be problematic to a machine vision algorithm that is sensitive to edges. For such images, the algorithms can be made more robust or the mask can be used so that the algorithm understands the locations of the spurious edges so those edges can be ignored and other edges used to extract information. An example of extracting information includes selecting text for analysis using an Optical Character Recognition (OCR) application. Another example involves deep neural network learning where various edge orientations and strengths are analyzed in the training to learn characteristics of various types of item for identification. A few spurious edges may not negatively impact such an algorithm, but in some embodiments the masks can be used as well to learn to use the mask in the analysis, such as to weight various edges based on proximity to a mask boundary. In some embodiments the algorithm can instead ignore any edges or features within a specified distance of a mask boundary, etc. FIG. 4B illustrates another example mask 450 which includes three regions, including a first region 452 where all the data comes from a first camera, a second region 454 where all the data comes from a second camera, and a third region 456 where the data is a weighted combination of data from both cameras. Various other types of masks can be used as well, as may depend in at least some cases upon the number of cameras and types of combinations used.

Another advantage to such approaches is that the amount of bandwidth needed can be reduced. In some embodiments two partial images can be sent with a mask indicating which camera was used to contribute to each part of the image. For such a binary approach the image regions would be sourced image from one camera or the other, enabling the image data to be treated separately. The image data can also be combined, which can result in shears or discontinuities in the image where the local disparity was unknown and could not be completely corrected. The mask data could still be used to determine which region came from which camera. In some embodiments, however, the mask can be part of an internal calculation used to put the image data together in a composite image with a target dynamic range. In some embodiments the image can then be tone mapped such that the brightness and colors appear to have been taken under substantially uniform lighting, although any shears or discontinuities would remain. Various estimation techniques can be used to attempt to minimize the presence of such discontinues, such as by estimating distance or disparity and attempting to minimize any difference errors, etc.

In embodiments where more than two cameras are used, the extent to which the exposure between images is adjusted can be smaller, to provide for more overlap in dynamic range. Such an approach comes with additional cost and processing overhead, however. Using two cameras to capture additional images over time can help to improve the overlap, but can be susceptible to motion artifacts as discussed elsewhere herein. As mentioned, in many embodiments the exposures (or other such settings) of the two cameras can be staggered or offset so that the entire range of brightness in the scene is covered, at least up to a maximum value or range. Since conventional miniature digital cameras typically do not rely on variable apertures, the exposure value can be a combination of the exposure time and the gain. The exposure values can be adjusted such that the range of brightness covered is continuous and minimally overlapping. This provides for improved dynamic range with no gaps or brightnesses not covered by either camera. In situations where a light sensor can determine the brightness range, the exposure values can be dynamically set accordingly.

If there is substantial overlap between the images, the image data can be brought into congruence, including accounting for local alignment where there is overlap. The brightness and color values from each constituent camera can be combined. For regions where there is no overlap, where either one camera is burnt out or the exposure value is so low it is essentially black or lost in the noise, a choice can be made to present the image data from either one camera or the other. For situations or embodiments where there is insufficient data for registration or distance determinations, a decision may be made to use data from one camera or the other without blending, in order to avoid inadvertently blending regions that do not properly align or correspond. In areas of overlap a relative weighting can be determined based on whether the brightness levels are in an ideal or usable range for the camera. For an eight bit image the system might range from 0 to 255 brightness levels. A noise floor, also referred to as a "black clamp" or noise threshold, may be instituted at a modest value, such as 8 or 10, such that any values below that floor are considered to be black to minimize the presence of noise in the image. For relatively dark regions the pixel values may vary due to limitations of the image sensor, and these variations can potentially be detected as image features or edges. Accordingly, to improve accuracy and reduce the presence of false positives the noise floor can be set to an appropriate values such that any pixels with values below the noise floor can essentially be set to a value of zero, corresponding to black. There may also be a maximum value set in some situations, which can correspond to a saturation level or saturation threshold. As with dark regions, very bright regions can also demonstrate variations in pixel value due to the limitations in the sensor (and other such causes) which can be mistakenly detected as image features, such that it may be desirable to set a saturation level (such as 230) above which all pixel values will be ignored or set to 255 (i.e., white). For regions where the image data is within the range between the noise floor and the saturation level there can be a weighted combination performed. In at least some embodiments the relative weighting is determined by how close each camera is to a mid-level exposure, such as with a value of 128. In some embodiments where the information is available from both cameras a block matching can be performed. Attempts can be made to minimize differences and correlations can be performed as appropriate determine how to warp the image locally to being the images into alignment or congruence.

In at least some embodiments an attempt can be made to eliminate or correct all of the disparity. If the image data and/or cameras are substantially static, additional exposures can be made to provide additional overlap. For transient or mobile items in the scene, however, such an approach may not be beneficial. A temporal exposure scheme may not be effective in the case of motion, where objects are in different locations between images. An attempt can be made to account for the motion, but this works primarily for lateral motions and not rotations or other such motions. In some embodiments an interlaced approach can be used that used data from each camera on alternating pixel rows or lines, but combining alternating rows of bright and dark pixels may not allow for accurate analysis.

Figure 5:
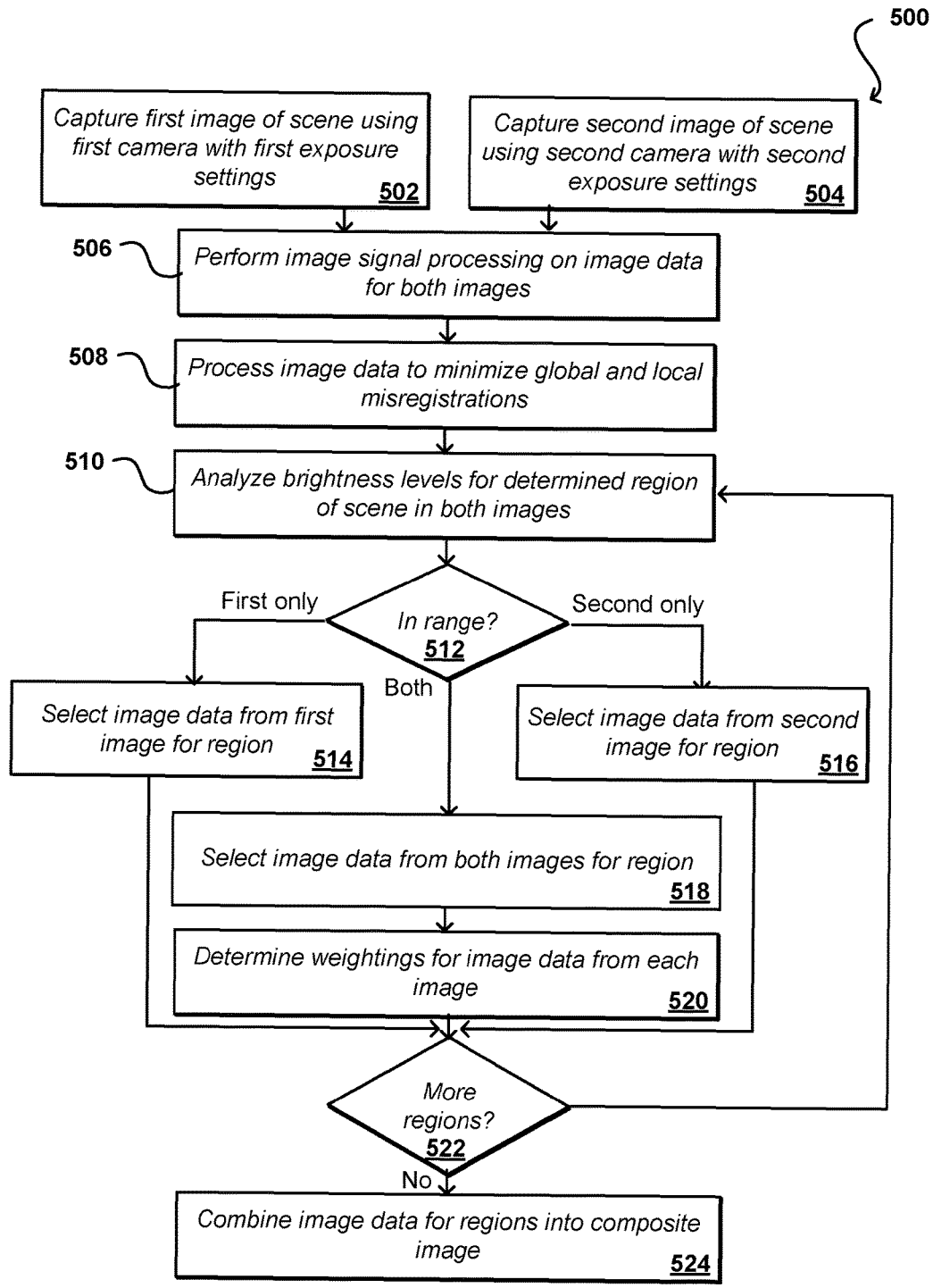
FIG. 5 illustrates an example process for generating a composite image with high dynamic range that can be utilized in accordance with various embodiments.

FIG. 5 illustrates an example process 500 for generating a high dynamic range image using multiple image sensors that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a first set of image data is captured 502 for a scene using a first camera with first exposure (or other such) settings. Concurrently, or as close to the same time as possible, a second image is captured 504, or second image data acquired, using a second camera (or camera assembly) using second exposure settings. As mentioned, the exposure settings can be selected for the two cameras in order to provide maximum dynamic range with minimum overlap. One of the exposure settings can be selected to capture image data in highlight regions while the other exposure setting can be selected to capture image data for shadow regions, among other such options. Image signal processing can be performed 506 on the image data from each camera in order to perform modifications such as debayering, bad pixel correction, relative illumination correction, demosaicing, image sharpening, and the like. The image data can then be passed to another processor or device for processing 508 the image data to remove, or at least minimize, artifacts due to global and local misregistrations.

Once any processing is completed, the image data can be analyzed to determine regions of different brightness in the image data. For each region, the brightness levels can be analyzed 510 to determine the range for a given region. A determination can be made 512 as to which set of image data has brightness values for that region that are within a determined range, such as between the noise floor and the saturation level. If only the values of the first set are within that range, then the image data (i.e., brightness and color values for the pixels of that region) from the first set can be selected 514 for that region. If only the values of the second set are within that range, then the image data from the second set can be selected 516 for that region. If the image data from both image sets is within the range, then image data from both image sets can be selected 518 for that region. This can include, for example, determining 520 relative weightings for the values from each image set, as may be based upon distance to a mid-range brightness value or other such metric. In some embodiments where data is only selected from one image or the other with no blending or weighted averaging, the image data with the brightness values closest to the mid-range value can be selected for that region. The process can continue as long as it is determined 522 that there are more regions to be analyzed. Once image data has been selected for each region of the image, the image data can be combined 524 or composited into a single image with improved dynamic range.

Figure 6:
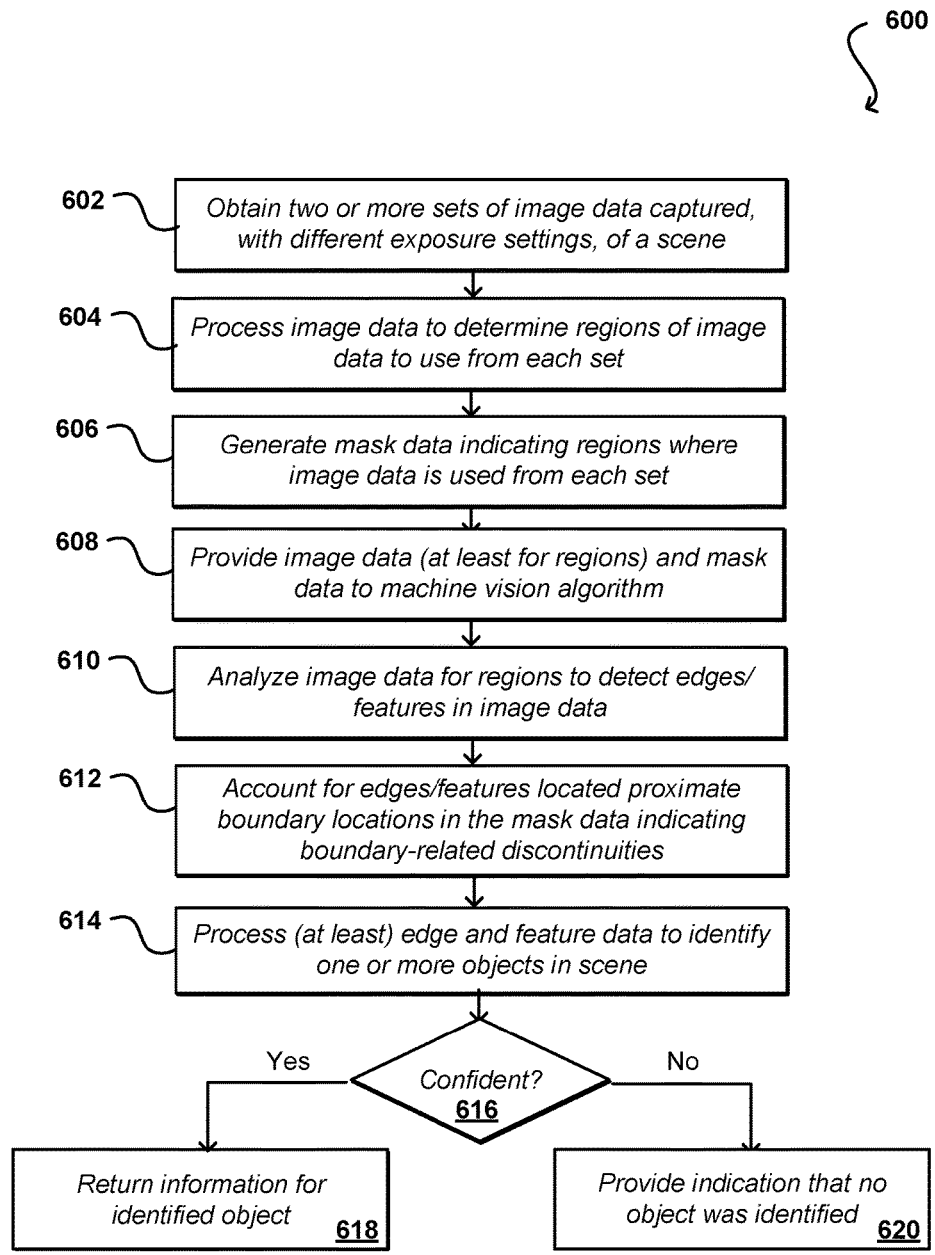
FIG. 6 illustrates an example process for analyzing image data using an image data mask that can be utilized in accordance with various embodiments.

FIG. 6 illustrates an example process 600 for using the composite image data with a machine vision algorithm that can be utilized in accordance with various embodiments. In this example, two or more sets of image data are obtained 602 that include image data captured concurrently by at least two cameras with different exposure settings, such as described with respect to FIG. 5. The image data can be processed 604 to determine regions of the image data to use from each set. As mentioned, this can include determining regions where values from one of the image data sets is below the noise floor or above the saturation level, or meet another such criterion. Once the regions are determined, the boundaries of those regions can be used to generate mask data 606 identifying the boundaries, as well as potentially which camera(s) provided the data for each region. This can include individual cameras or combinations of cameras, and for combinations can include weighting or other information. The image data (combined or separately) and the mask data can be provided 608 to a machine vision algorithm, or other such process or service. The algorithm can analyze 610 the image data to detect edges and/or features that can be useful in identifying one or more objects represented in the image data. The process can also involve determining which of the determined edges or features are proximate any of the mask boundary location and accounting 612 for the boundary-related discontinuities. This can include, for example, removing those points from consideration, weighting those values lower than other values, marking the edges as potential boundary artifacts, etc. The edge and feature data can then be processed 614 to identify or recognize one or more objects in the scene as represented in the image data. If an object is determined 616 to be identified with at least a minimum level of confidence, then information for the identified object(s) can be returned 618 or otherwise provided. The information can come from an electronic catalog, data repository, or other such location. If no object can be identified with at least a minimum level of confidence then indication can be provided 620 that no object was able to be identified from the image data.

Various applications can take advantage of aspects of the various embodiments. For example, vehicle guidance systems can use such an approach to identify objects within or near a path of travel of the vehicle. Such approaches can be particularly beneficial for situations where the lighting may change or vary, or where there might be strong light and shadows, such as in direct sunlight. The ability to capture high dynamic range images without requiring a series of images can also be beneficial for such applications where there can be an appreciable amount of movement. Such approaches may not be optimal for consumer cameras, due to the presence of discontinuities, but for algorithms that can substantially remove these discontinuities consumer cameras and devices can benefit from the various embodiments as well.

Figure 7:
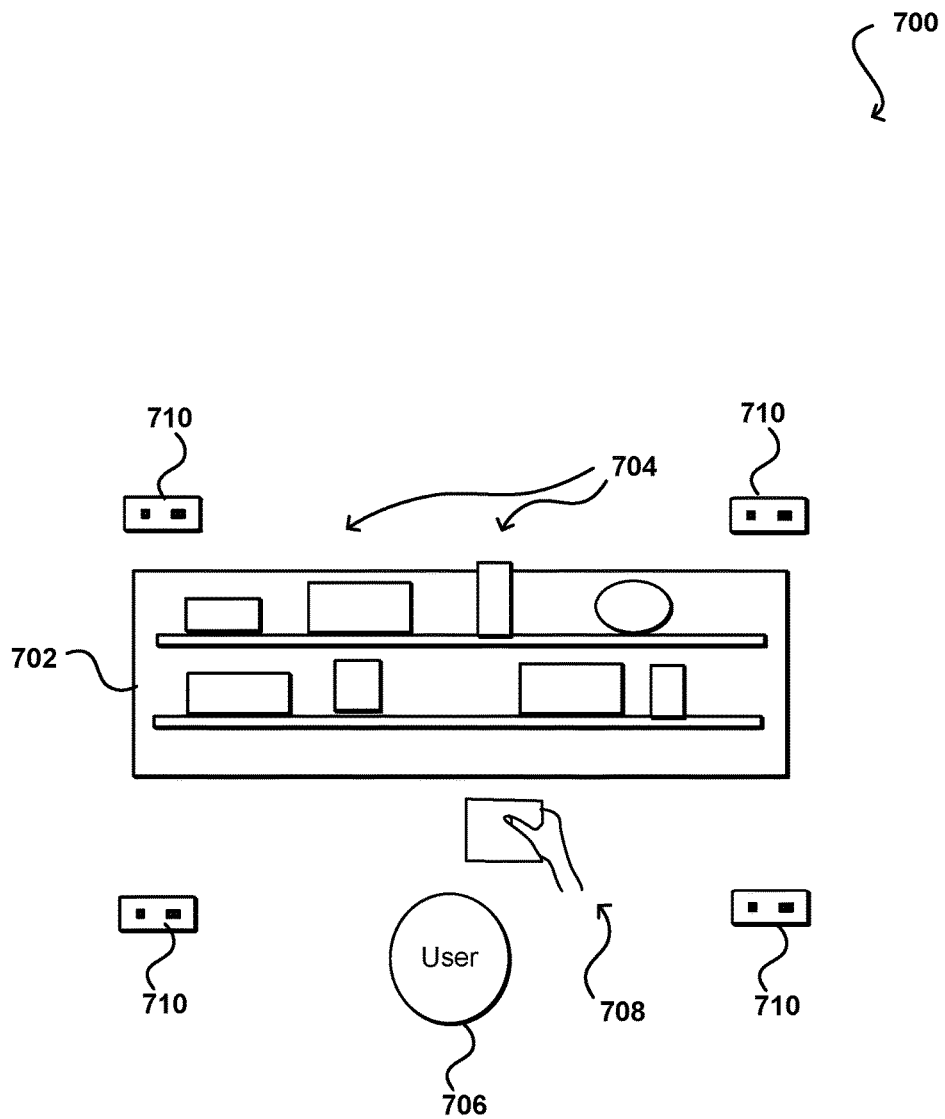
FIG. 7 illustrates an example environment in which multiple imaging devices are used to identify items selected by a user that can be utilized in accordance with various embodiments.

FIG. 7 illustrates an example environment 700 in which aspects of the various embodiments can be implemented. In this example, a user 706 is in a location such as a physical store, where items 704 offered for consumption (i.e., purchase, rent, or borrow) are displayed on shelving 702 or other appropriate support. In this environment, a plurality of imaging devices 710 are positioned about the store such that the items 704 on the shelving 702 are located within a field of view of at least one of the imaging devices. As discussed elsewhere herein, each imaging device can include a pair of cameras (or camera assemblies) capable of capturing image data useful for computer vision but utilizing camera elements such as conventional miniature digital cameras. The imaging devices 710 can capture image data of the items 704 and analyze the captured image data using computer vision, object recognition, and/or other such processes to recognize and identify the various items. A user 706 in the store can be identified, whether by computer vision, login, detection or scanning of a computing device, or another such process. The location of the user 706 in the store can be determined using one or more techniques, as may include location determination using a GPS or position sensor of a user computing device (e.g., smart phone) or computer vision and object tracking, among other such options. When the user reaches for an item 704, that user's hand can be represented in image data captured by the imaging devices 710 and identified as a user hand. Various other techniques can be used as well, such as tone identification or thermal imaging to improve the accuracy of a hand determination. When the user removes an item 704 from the shelving, the product grabbed by the hand and removed from the shelving can be determined based upon analyzing the image data captured by the respective imaging device(s) 710. That item 710 can then be associated with the user, such that if the user leaves the store the item can be automatically charged (or checked out, etc.) to an account for that user. If the user 706 puts the item back on the shelving, in the same or a different location, image data can again be captured by one or more imaging devices 710 and analyzed to identify the item and ensure that the item is placed back in store inventory and not charged to the user. As mentioned, imaging devices 710 in accordance with the various embodiments can improve accuracy by being able to capture images that are robust to lighting variations, and the relatively low cost of the devices enables several devices to be placed throughout the store such that every location in the store can be imaged by one or more of the imaging devices. In addition to shopping, such approaches can be beneficial for loss prevention, inventory tracking, and other such objectives.

Figure 8:
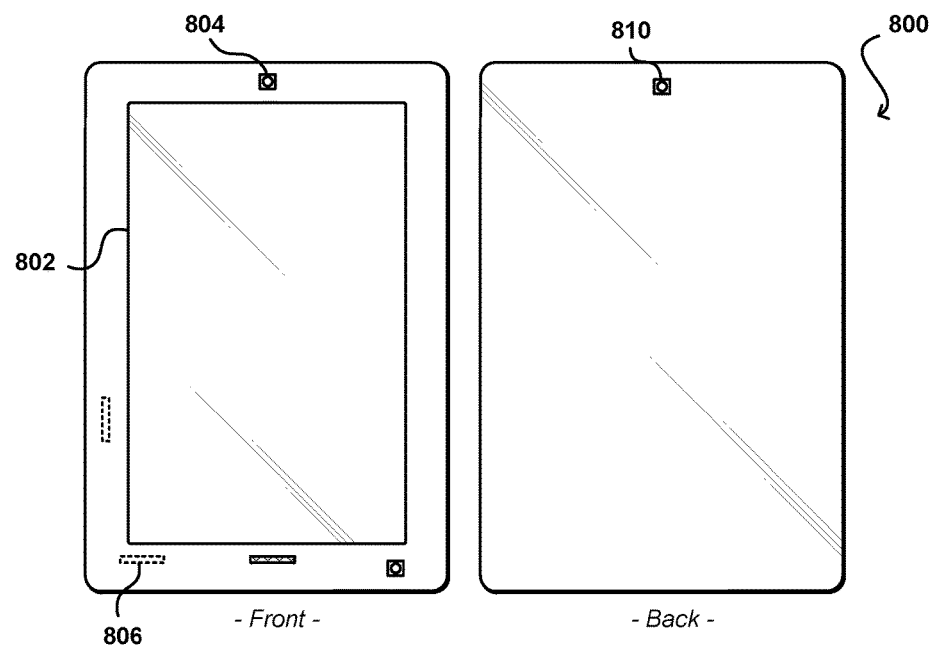
FIG. 8 illustrates an example computing device that can be used to implement aspects of various embodiments.

FIG. 8 illustrates front and back views of an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 800 has a display screen 802, which under normal operation will display information to a user (or viewer) facing the display screen (e.g., on the same side of the computing device as the display screen). The computing device in this example can include one or more image capture elements, in this example including an image capture element 804 on the front of the device and an image capture element 806 on the back of the device, although it should be understood that additional or fewer image capture elements could be used, and could also, or alternatively, be placed on the sides, corners, or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data. As discussed herein, the device can include one or more motion and/or orientation-determining elements, such as may include an electronic compass 806 and an electronic gyroscope 808, as well as an accelerometer, inertial sensor, global positioning sensor, proximity sensor, and the like, which can assist with movement and/or orientation determinations.

Figure 9:
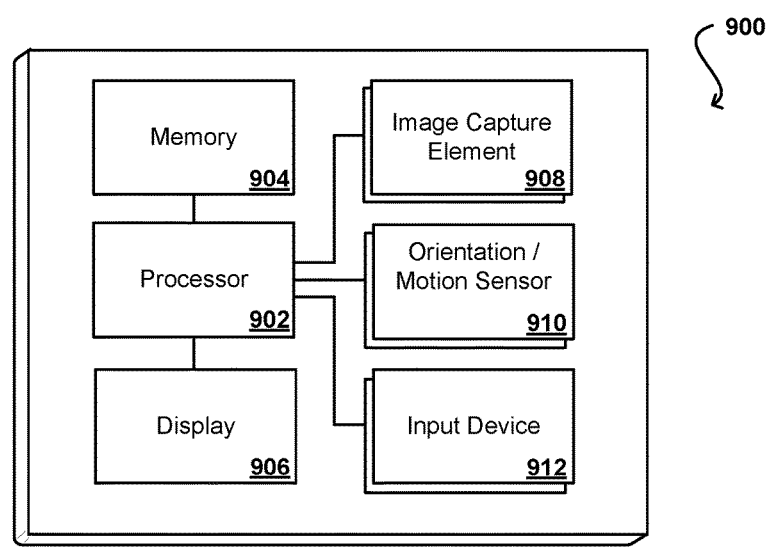
FIG. 9 illustrates components of an example computing device that can be used to implement aspects of various embodiments.

FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one motion and/or orientation determining element 910, such as an accelerometer, digital compass, electronic gyroscope, or inertial sensor, which can assist in determining movement or other changes in orientation of the device. The device can include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
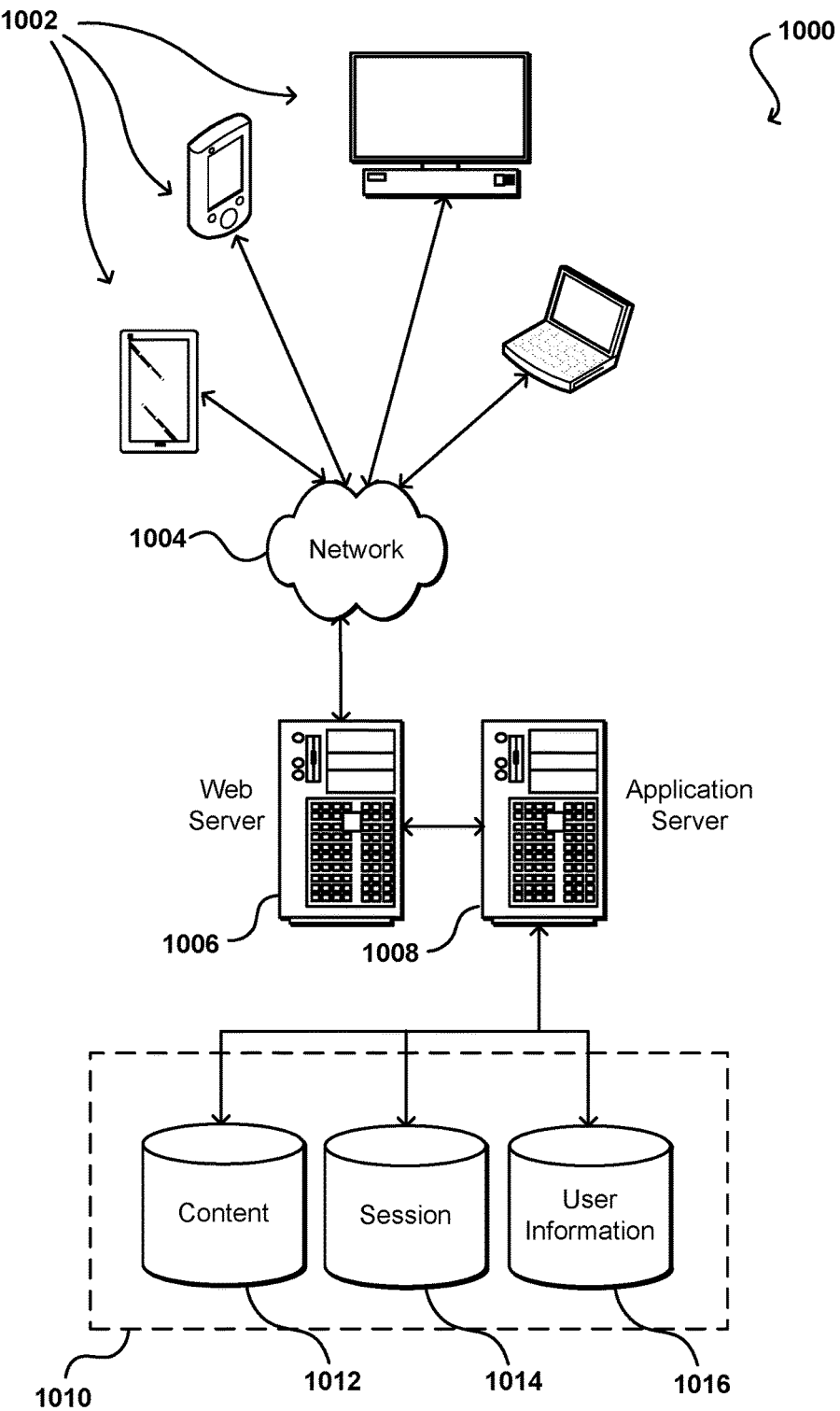
FIG. 10 illustrates an example environment in which aspects of various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices will also typically include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and other non-transitory media, such as, but not limited to, volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    a first camera having first exposure settings selected for a first dynamic range;
    a second camera having second exposure settings selected for a second dynamic range, the second dynamic range overlapping the first dynamic range by less than a specified amount, the second camera being laterally offset from the first camera;
    at least one processor; and
    memory including instructions that, when executed by the at least one processor, cause the system to:
        capture first image data using the first camera;
        capture, concurrently with the first image data, second image data using the second camera;
        determine a plurality of corresponding regions of the first image data and the second image data;
        select first pixel values from the first image data for pixel locations in a first region of the plurality of corresponding regions based on brightness values for the first pixel values falling within a target range;
        select second pixel values from the second image data for pixel locations in a second region of the plurality of corresponding regions based on brightness values for the second pixel values falling within the target range; and
        generate a composite image using the first pixel values for the first region and the second pixel values for the second region.

2. The system of claim 1, wherein the instructions when executed further cause the system to:
    determine, for third pixel locations contained within a third region of the plurality of regions, blended pixel values corresponding to a combination of corresponding third pixel values from the first image data and corresponding fourth pixel values from the second image data, based on brightness values for the corresponding third pixel values and the corresponding fourth pixel values falling within the target range; and
    generate the composite image to further include the blended pixel values for the third region.

3. The system of claim 1, further comprising:
    a red-blue-green (RGB) color filter array (CFA) positioned with respect to the first camera such that light passing through the RGB CFA and is captured by the first camera.

4. The system of claim 1, wherein the instructions when executed further cause the system to:
    select the first exposure settings for the first camera to provide for greater capture duration than for the second camera.

5. The system of claim 1, further comprising:
    a third camera for capturing color data to be applied to the second image data, the second camera configured to capture panchromatic image data.

6. The system of claim 1, wherein the instructions when executed further cause the system to:

determine correspondence between pixel locations of the first image data and respective pixel locations of the second image data.

7. The system of claim 1, wherein the instructions when executed further cause the system to:
generate mask data identifying a boundary between the first region and the second region; and
identify, using the composite image and the mask data, at least one of features or edges in the composite image corresponding to discontinuities near the boundary.

8. The system of claim 7, wherein the instructions when executed further cause the system to:
exclude from consideration by a computer vision algorithm the discontinuities near the boundary.

9. The system of claim 8, wherein the instructions when executed further cause the system to:
analyze the composite image using the computer vision algorithm to identify at least one object represented in the composite image.

10. The system of claim 1, wherein the instructions when executed further cause the system to:
determine the first set of exposure settings for the first camera through at least one of a gain setting or a duration setting for the first camera.

11. A computer-implemented method, comprising:
obtaining first image data captured using a first camera having first exposure settings selected for a first dynamic range;
obtaining, concurrently with the first image data, second image data using a second camera having second exposure settings selected for a second dynamic range, the second dynamic range overlapping the first dynamic range by less than a specified amount, the second camera being laterally offset from the first camera;
determining a plurality of corresponding regions of the first image data and the second image data;
selecting first pixel values from the first image data for pixel locations in a first region of the plurality of corresponding regions based on brightness values for the first pixel values falling within a target range;
selecting second pixel values from the second image data for pixel locations in a second region of the plurality of corresponding regions based on brightness values for the second pixel values falling within the target range; and
generating a composite image using the first pixel values for the first region and the second pixel values for the second region.

12. The computer-implemented method of claim 11, further comprising:
determining, for third pixel locations contained within a third region of the plurality of regions, blended pixel values corresponding to a combination of corresponding third pixel values from the first image data and corresponding fourth pixel values from the second image data, based on brightness values for the corresponding third pixel values and the corresponding fourth pixel values falling within the target range; and
generating the composite image to further include the blended pixel values for the third region.

13. The computer-implemented method of claim 11, further comprising:
obtaining color data captured using a third camera; and
applying the color data to panchromatic data captured by the second camera to generate the second image data.

14. The computer-implemented method of claim 11, further comprising:
determining correspondence between pixel locations of the first image data and respective pixel locations of the second image data.

15. The computer-implemented method of claim 11, further comprising:
generating mask data identifying a boundary between the first region and the second region.

16. The computer-implemented method of claim 11, further comprising:
analyzing the composite image using at least one computer vision algorithm to identify at least one object represented in the composite image.

17. A non-transitory computer readable storage medium storing instructions that, when executed by at least one processor of a computing device, cause the computing device to:
obtain first image data captured using a first camera having first exposure settings selected for a first dynamic range;
obtain, concurrently with the first image data, second image data using a second camera having second exposure settings selected for a second dynamic range, the second dynamic range overlapping the first dynamic range by less than a specified amount, the second camera being laterally offset from the first camera;
determine a plurality of corresponding regions of the first image data and the second image data;
select first pixel values from the first image data for pixel locations in a first region of the plurality of corresponding regions based on brightness values for the first pixel values falling within a target range;
select second pixel values from the second image data for pixel locations in a second region of the plurality of corresponding regions based on brightness values for the second pixel values falling within the target range; and
generate a composite image using the first pixel values for the first region and the second pixel values for the second region.

18. The non-transitory computer readable storage medium of claim 17, wherein the instructions, when executed by the at least one processor, further cause the computing device to:
determine, for third pixel locations contained within a third region of the plurality of regions, blended pixel values corresponding to a combination of corresponding third pixel values from the first image data and corresponding fourth pixel values from the second image data, based on brightness values for the corresponding third pixel values and the corresponding fourth pixel values falling within the target range; and
generate the composite image to further include the blended pixel values for the third region.

19. The non-transitory computer readable storage medium of claim 17, wherein the instructions, when executed by the at least one processor, further cause the computing device to:
obtain color data captured using a third camera; and
apply the color data to panchromatic data captured by the second camera to generate the second image data.

20. The non-transitory computer readable storage medium of claim 17, wherein the instructions, when executed by the at least one processor, further cause the computing device to:

determine correspondence between pixel locations of the first image data and respective pixel locations of the second image data.

* * * * *